(12) United States Patent  
Loukina et al.

(10) Patent No.: US 9,613,638 B2  
(45) Date of Patent: Apr. 4, 2017

(54) COMPUTER-IMPLEMENTED SYSTEMS AND METHODS FOR DETERMINING AN INTELLIGIBILITY SCORE FOR SPEECH

(71) Applicant: Educational Testing Service, Princton, NJ (US)

(72) Inventors: Anastassia Loukina, Bellport, NY (US); Keelan Evanini, Pennington, NJ (US)

(73) Assignee: Educational Testing Service, Princeton, NJ (US)

(\*) Notice: Subject to any disclaimer, the term of this patent is extended or adjusted under 35 U.S.C. 154(b) by 0 days.

(21) Appl. No.: 14/632,231

(22) Filed: Feb. 26, 2015

(65) Prior Publication Data

US 2015/0248898 A1    Sep. 3, 2015

Related U.S. Application Data

(60) Provisional application No. 61/945,856, filed on Feb. 28, 2014.

(51) Int. Cl.
- *G09B 19/04* (2006.01)
- *G10L 15/187* (2013.01)

(Continued)

(52) U.S. Cl.
CPC .............. *G10L 25/60* (2013.01); *G09B 19/04* (2013.01); *G10L 25/69* (2013.01); *G10L 15/187* (2013.01);

(Continued)

(58) Field of Classification Search
CPC ....... G10L 15/08; G10L 15/187; G10L 15/19; G10L 15/22; G10L 2015/221; G10L 2015/225; G10L 2015/227; G09B 19/04

(Continued)

(56) References Cited

U.S. PATENT DOCUMENTS

| | | | | |
|---|---|---|---|---|
| 4,741,036 A | * | 4/1988 | Bahl | G10L 15/144 704/256 |
| 6,055,498 A | * | 4/2000 | Neumeyer | G09B 19/04 434/185 |

(Continued)

OTHER PUBLICATIONS

Ge, et al. "Experimental investigation of mandarin pronunciation quality assessment system." Computer Science and Society (ISCCS), 2011 International Symposium on. IEEE, Jul. 2011, pp. 235-239.*

(Continued)

*Primary Examiner* — James Wozniak  
(74) *Attorney, Agent, or Firm* — Jones Day

(57) ABSTRACT

Systems and methods are provided for generating an intelligibility score for speech of a non-native speaker. Words in a speech recording are identified using an automated speech recognizer, where the automated speech recognizer provides a string of words identified in the speech recording, and where the automated speech recognizer further provides an acoustic model likelihood score for each word in the string of words. For a particular word in the string of words, a context metric value is determined based upon a usage of the particular word within the string of words. An acoustic score for the particular word is determined based on the acoustic model likelihood score for the particular word from the automated speech recognizer. An intelligibility score is determined for the particular word based on the acoustic score for the particular word and the context metric value for the particular word.

20 Claims, 8 Drawing Sheets

(51) Int. Cl.
*G10L 15/19* (2013.01)
*G10L 25/60* (2013.01)
*G10L 25/69* (2013.01)
*G10L 15/18* (2013.01)
*G10L 15/26* (2006.01)

(52) U.S. Cl.
CPC .......... *G10L 15/1822* (2013.01); *G10L 15/19* (2013.01); *G10L 15/26* (2013.01)

(58) Field of Classification Search
USPC ......... 704/251, 254, 270; 434/167, 178, 185
See application file for complete search history.

(56) References Cited

U.S. PATENT DOCUMENTS

| | | | | |
|---|---|---|---|---|
| 7,219,059 | B2* | 5/2007 | Gupta | G09B 19/06 704/238 |
| 7,467,087 | B1* | 12/2008 | Gillick | G10L 15/26 704/235 |
| 8,271,281 | B2* | 9/2012 | Jayadeva | G10L 15/26 434/185 |
| 8,457,967 | B2* | 6/2013 | Audhkhasi | G09B 19/04 704/10 |
| 8,775,184 | B2* | 7/2014 | Deshmukh | G09B 19/04 434/185 |
| 8,990,082 | B2* | 3/2015 | Yoon | G09B 19/06 434/157 |
| 2002/0160341 | A1* | 10/2002 | Yamada | G09B 5/065 434/157 |
| 2003/0182111 | A1* | 9/2003 | Handal | G09B 19/04 704/231 |
| 2005/0137862 | A1* | 6/2005 | Monkowski | G10L 15/06 704/222 |
| 2006/0057545 | A1* | 3/2006 | Mozer | G09B 5/06 434/156 |
| 2006/0069561 | A1* | 3/2006 | Beattie | G10L 15/22 704/251 |
| 2006/0110711 | A1* | 5/2006 | Julia | G09B 7/02 434/156 |
| 2006/0111902 | A1* | 5/2006 | Julia | G09B 5/06 704/236 |
| 2006/0155538 | A1* | 7/2006 | Higgins | G09B 19/06 704/246 |
| 2008/0140401 | A1* | 6/2008 | Abrash | G09B 19/06 704/251 |
| 2008/0221893 | A1* | 9/2008 | Kaiser | G10L 15/24 704/257 |
| 2008/0228485 | A1* | 9/2008 | Owen | G06F 17/30681 704/254 |
| 2009/0258333 | A1* | 10/2009 | Yu | G09B 5/04 434/157 |
| 2009/0292538 | A1* | 11/2009 | Barnish | G10L 15/05 704/232 |
| 2009/0299731 | A1* | 12/2009 | Owen | G10L 13/08 704/9 |
| 2010/0125457 | A1* | 5/2010 | Gilbert | G10L 15/063 704/254 |
| 2010/0145698 | A1* | 6/2010 | Chen | G09B 7/02 704/256.1 |
| 2010/0151427 | A1* | 6/2010 | Tsai | G09B 19/06 434/169 |
| 2011/0035219 | A1* | 2/2011 | Kadirkamanathan | G10L 15/005 704/239 |
| 2011/0184723 | A1* | 7/2011 | Huang | G06F 17/2705 704/8 |
| 2011/0270612 | A1* | 11/2011 | Yoon | G09B 19/06 704/251 |
| 2012/0134548 | A1* | 5/2012 | Rhoads | G06Q 30/06 382/118 |
| 2012/0290300 | A1* | 11/2012 | Lee | G09B 19/06 704/235 |
| 2013/0004931 | A1* | 1/2013 | Attali | G09B 19/06 434/353 |
| 2013/0035939 | A1* | 2/2013 | Gilbert | G10L 15/063 704/254 |
| 2013/0059276 | A1* | 3/2013 | Allen | G09B 5/065 434/167 |
| 2013/0191129 | A1* | 7/2013 | Kurata | G10L 15/04 704/254 |
| 2014/0141392 | A1* | 5/2014 | Yoon | G09B 5/04 434/156 |
| 2014/0272842 | A1* | 9/2014 | Kwiatkowski | G09B 7/00 434/236 |
| 2014/0358548 | A1* | 12/2014 | Nakata | G10L 25/60 704/260 |
| 2015/0161985 | A1* | 6/2015 | Peng | G10L 15/26 704/235 |

OTHER PUBLICATIONS

Geng, et al. "Text-independent pronunciation evaluation based on phone-level Gaussian classifier." Signal Processing (ICSP), 2010 IEEE 10th International Conference on. IEEE, Oct. 2010, pp. 557-560.*

Graesser, Arthur C., et al. "Coh-Metrix: Analysis of text on cohesion and language." Behavior research methods, instruments, & computers 36.2, May 2002, pp. 193-202.*

Liu, Qingsheng, et al. "The application of phone weight in Putonghua pronunciation quality assessment." Proc. ISCSLP, Sep. 2006, pp. 1-6.*

Minematsu, Nobuaki, Gakuto Kurata, and Keikichi Hirose. "Integration of MLLR adaptation with pronunciation proficiency adaptation for non-native speech recognition." Interspeech. Sep. 2002, pp. 529-532.*

Zhang, Feng, et al. "Automatic mispronunciation detection for Mandarin." Acoustics, Speech and Signal Processing, 2008. ICASSP 2008. IEEE International Conference on. IEEE, Apr. 2008, pp. 5077-5080.*

Mak, Brian, et al. "Plaser: pronunciation learning via automatic speech recognition." Proceedings of the HLT-NAACL 03 workshop on Building educational applications using natural language processing—vol. 2. Association for Computational Linguistics, Jun. 2003, pp. 23-29.*

Zechner, Klaus, et al. "Automatic scoring of non-native spontaneous speech in tests of spoken English." Speech Communication 51.10, Oct. 2009, pp. 883-895.*

Franco, Horacio, et al. "EduSpeak®: A speech recognition and pronunciation scoring toolkit for computer-aided language learning applications." Language Testing 27.3, Jul. 2010, pp. 401-418.*

Chen, Lei, Zechner, Klaus, Xi, Xiaoming; Improved Pronunciation Features for Construct-Driven Assessment of Non-Native Spontaneous Speech; Proceedings of Human Language Technologies: The 2009 Annual Conference of the North American Chapter of the ACL; pp. 442-449; 2009.

Cincarek, Tobias, Gruhn, Rainer, Hacker, Christian, Noth, Elmar, Nakamura, Satoshi; Automatic Pronunciation Scoring of Words and Sentences Independent from the Non-Native's First Language; Computer Speech & Language, 23(1); pp. 65-88; 2009.

Evanini, Keelan, Huang, Becky; Automatic Detection of [ ] Pronunciation Errors for Chinese Learners of English; Proceedings of the International Symposium on Automatic Detection of Errors in Pronunciation Training; pp. 71-74; Stockholm, Sweden; 2012.

Franco, Horacio, Neumeyer, Leonardo, Kim, Yoon, Ronen, Orith; Automatic Pronunciation Scoring for Language Instruction; IEEE International Conference on Acoustics, Speech, and Signal Processing, 2; pp. 1471-1474; 1997.

Ito, Akinori, Lim, Yen-Ling, Suzuki, Motoyuki, Makino, Shozo; Pronunciation Error Detection for Computer-Assisted Language Learning System Based on Error Rule Clustering Using a Decision Tree; Acoustical Science and Technology, 28(2); pp. 131-133; 2007.

Koniaris, Christos, Salvi, Giampiero, Engwall, Olov; Mispronunciation Analysis of Individual Foreign Speakers Using Auditory Periphery Models; Speech Communication, 55(5); pp. 691-706; 2013.

(56) References Cited

OTHER PUBLICATIONS

Molina, Carlos, Yoma, Nestor Becerra, Wuth, Jorge, Vivanco, Hiram; ASR Based Pronunciation Evaluation with Automatically Generated Competing Vocabulary and Classifier Fusion; Speech Communication, 51(6); pp. 485-498; 2009.

Pongkittiphan, Teeraphon, Minematsu, Nobuaki, Makino, Takehiko, Hirose, Keikichi; Automatic Detection of the Words that will Become Unintelligible Through Japanese Accented Pronunciation of English; Proceedings of SLaTE; Grenoble, France; pp. 109-111; 2013.

Strik, Helmer, Truong, Khiet, De Wet, Febe, Cucchiarini, Catia; Comparing Different Approaches for Automatic Pronunciation Error Detection; Speech Communication, 51(10); pp. 845-852; 2009.

Tepperman, Joseph, Narayanan, Shrikanth; Using Articulatory Representations to Detect Segmental Errors in Nonnative Pronunciation; IEEE Transactions on Audio, Speech, and Language Processing, 16(1); pp. 8-22; Jan. 2008.

Van Doremalen, Joost, Cucchiarini, Catia, Strik, Helmer; Automatic Pronunciation Error Detection in Non-Native Speech: The Case of Vowel Errors in Dutch; Journal of the Acoustical Society of America, 134(2); pp. 1336-1347; Aug. 2013.

Wei, Si, Hu, Gupoing, Hu, Yu, Wang, Ren-Hua.; A New Method for Mispronunciation Detection Using Support Vector Machine Based on Pronunciation Space Models; Speech Communication, 51(10); pp. 896-905; 2009.

Witt, S., Young, S.; Phone-Level Pronunciation Scoring and Assessment for Interactive Language Learning; Speech Communication, 30(2); pp. 95-108; 2000.

Zechner, Klaus, Higgins, Derrick, XI, Xiaoming, Williamson, David; Automatic Scoring of Non-Native Spontaneous Speech in Tests of Spoken English; Speech Communication, 51(10); pp. 883-895; 2009.

* cited by examiner

COMPUTER-IMPLEMENTED SYSTEMS AND METHODS FOR DETERMINING AN INTELLIGIBILITY SCORE FOR SPEECH

CROSS-REFERENCE TO RELATED APPLICATIONS

This application claims priority to U.S. Provisional Patent Application No. 61/945,856, filed Feb. 28, 2014, entitled "A Method to Compute Intelligibility Scores, Identify Mispronounced Words and Evaluate Accuracy of Spoken Responses for Automated Speech Scoring," which is incorporated herein by reference in its entirety.

FIELD

The technology described in this patent document relates generally to speech processing and scoring and more particularly to automatically scoring the intelligibility of recorded speech.

BACKGROUND

The ability to communicate well is a crucial skill that greatly improves quality of life for a person. Pronunciation evaluation and feedback can be important tools for improving a speaker's ability to be easily understood. For example, a speaker learning a second language can improve their ability to be understood by native speakers of that second language by improving their pronunciation, such that it is more similar to a native speaker of that second language. Traditionally, speech pronunciation has been evaluated by comparing an examinee's speech to that of a native speaker. For example, a human evaluator can listen to the speaker and identify differences in the speaker's pronunciation compared to a native speaker. The evaluator then provides a score and/or feedback to the examinee, which can aid the examinee in improving their communication ability.

SUMMARY

Systems and methods are provided for generating an intelligibility score for speech of a non-native speaker. Words in a speech recording are identified using an automated speech recognizer, where the automated speech recognizer provides a string of words identified in the speech recording, and where the automated speech recognizer further provides an acoustic model likelihood score for each word in the string of words. For a particular word in the string of words, a context metric value is determined based upon a usage of the particular word within the string of words. An acoustic score for the particular word is determined based on the acoustic model likelihood score for the particular word from the automated speech recognizer. An intelligibility score is determined for the particular word based on the acoustic score for the particular word and the context metric value for the particular word, and an overall intelligibility score for the string of words is determined based on the intelligibility score for the particular word and intelligibility scores for other words in the string of words.

As another example, a computer-implemented system for generating an intelligibility score for speech of a non-native speaker includes a processing system and a non-transitory computer-readable medium encoded to contain instructions for commanding the execute steps of a method. In the method, words in a speech recording are identified using an automated speech recognizer, where the automated speech recognizer provides a string of words identified in the speech recording, and where the automated speech recognizer further provides an acoustic model likelihood score for each word in the string of words. For a particular word in the string of words, a context metric value is determined based upon a usage of the particular word within the string of words. An acoustic score for the particular word is determined based on the acoustic model likelihood score for the particular word from the automated speech recognizer. An intelligibility score is determined for the particular word based on the acoustic score for the particular word and the context metric value for the particular word, and an overall intelligibility score for the string of words is determined based on the intelligibility score for the particular word and intelligibility scores for other words in the string of words.

As a further example, a non-transitory computer-readable medium is encoded with instructions for commanding a processing system to execute a method of generating an intelligibility score for speech of a non-native speaker. In the method, words in a speech recording are identified using an automated speech recognizer, where the automated speech recognizer provides a string of words identified in the speech recording, and where the automated speech recognizer further provides an acoustic model likelihood score for each word in the string of words. For a particular word in the string of words, a context metric value is determined based upon a usage of the particular word within the string of words. An acoustic score for the particular word is determined based on the acoustic model likelihood score for the particular word from the automated speech recognizer. An intelligibility score is determined for the particular word based on the acoustic score for the particular word and the context metric value for the particular word, and an overall intelligibility score for the string of words is determined based on the intelligibility score for the particular word and intelligibility scores for other words in the string of words.

DETAILED DESCRIPTION

Figure 1:
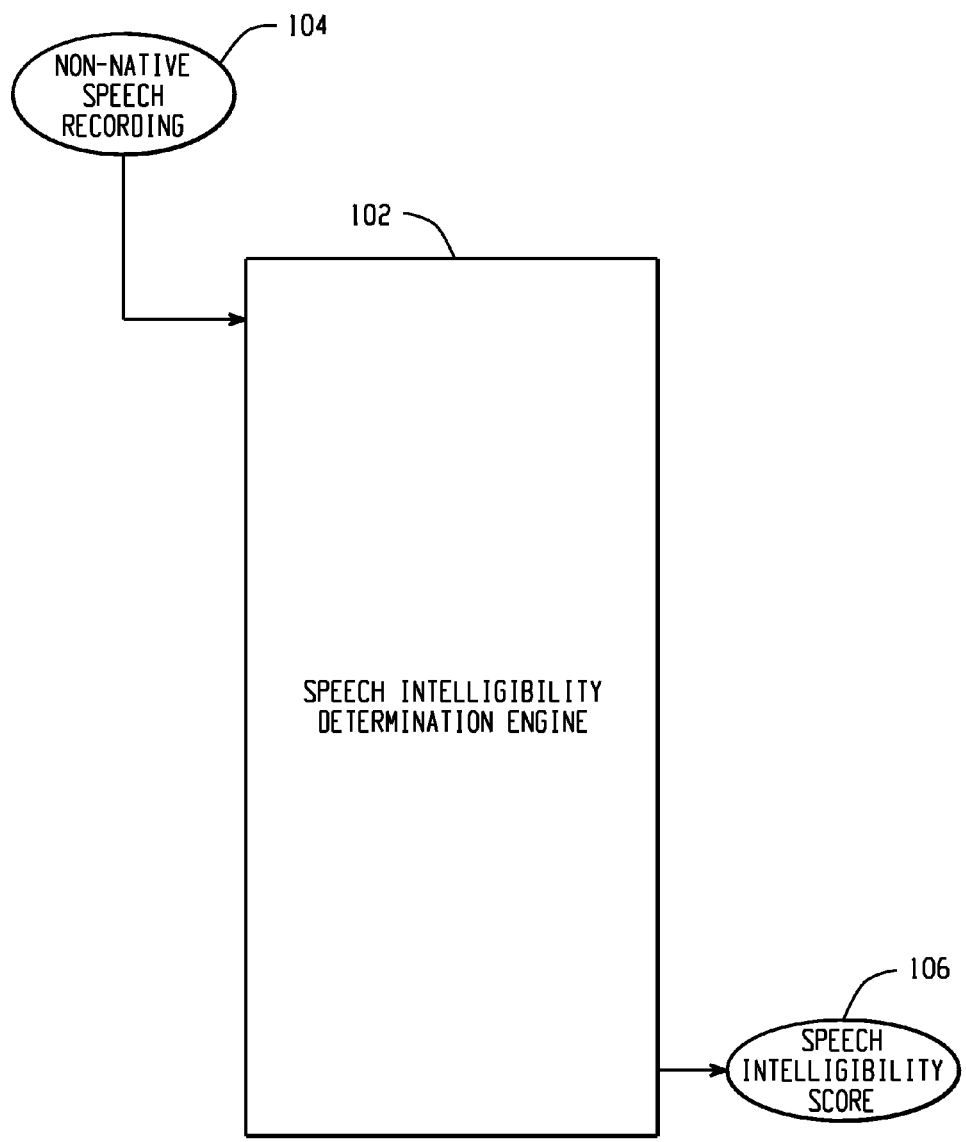
FIG. 1 is a block diagram depicting a computer implemented speech intelligibility determination engine.

FIG. 1 is a block diagram depicting a computer implemented speech intelligibility determination engine. Traditionally, pronunciation evaluation has been used as a proxy for measuring how well an examinee can be understood. Differences between the examinee's pronunciation and a typical native speaker's pronunciation are identified, and a pronunciation score is provided that is an approximation of the intelligibility of that examinee's speech. While a straight, phone-by-phone or word-by-word pronunciation comparison does provide some insight into speech intelligibility, it is not a direct measure of intelligibility. This is because a pronunciation-only evaluation ignores the context of the phones or words present in the speech. That is, while almost every pronunciation error affects the intelligibility of speech, certain errors affect intelligibility more than others based when those errors occur in the speech (e.g., mispronunciation in combination with a poor word choice is more detrimental to intelligibility than mispronunciation of a correct word in a context).

Context can provide significant clues to a listener as to sounds or words presented in speech, such that a listener may be able to understand speech or portions of speech even when the speaker's pronunciation is sub-optimal. For example, when a listener is conversant in a topic discussed by a speaker, the listener can more easily understand what is being spoken based on an understanding of the context of the speech despite pronunciation errors. In contrast, it can be much more difficult to understand a speaker making pronunciation errors when the discussion is based on a topic of little knowledge to the listener. Thus, while even a very proficient non-native speaker's pronunciation may differ from a native speaker's (e.g., an accent), the context of occurrences of those differences can highly affect the intelligibility or understandability of that speech.

Systems and methods herein provide mechanisms for measuring the intelligibility of speech by considering context of speech (e.g., phones, words within the speech) in addition to pronunciation. With reference to FIG. 1, a computer implemented speech intelligibility determination engine 102 receives a speech sample to analyze, such as a recording of speech 104 by a non-native speaker. The speech intelligibility determination engine 102 analyzes the recording 104 based on pronunciation of phones and words within the speech in combination with the context of those phones and words to generate a speech intelligibility score 106.

Figure 2:
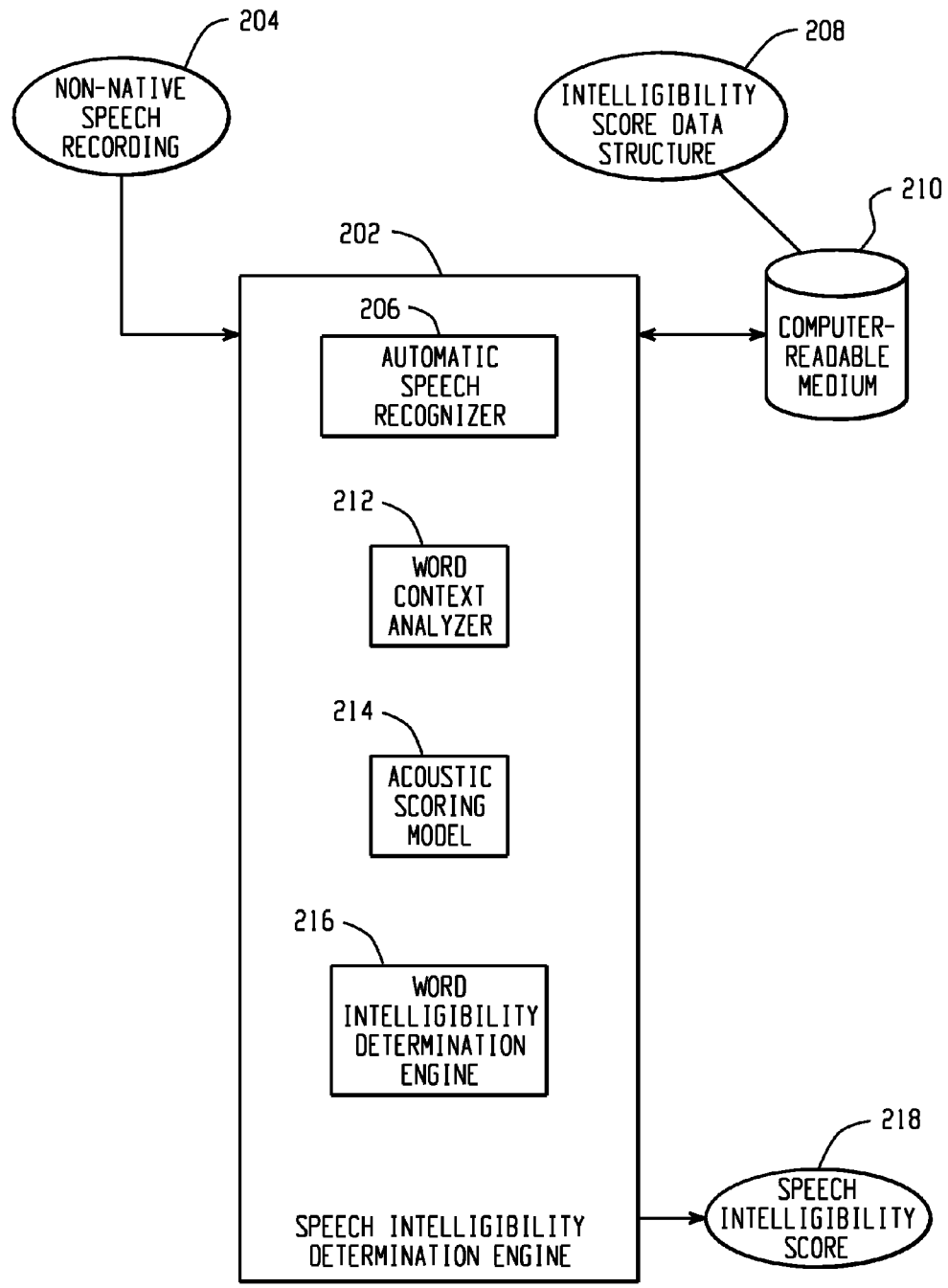
FIG. 2 is a diagram depicting example components of a speech intelligibility determination engine.

FIG. 2 is a diagram depicting example components of a speech intelligibility determination engine. A speech intelligibility determination engine 202 receives speech to be analyzed, such as a non-native speech recording 204. An automatic speech recognizer 206 is configured to receive the non-native speech recording 204 and to recognize words within the recording 204 and certain metrics of the speech in the recording 204 (e.g., via a forced alignment procedure). Those words and metrics can be stored for downstream usage, such as in an intelligibility score data structure 208 on a non-transitory computer-readable medium 210. In one example, the automatic speech recognizer 206 is configured to identify a string of words identified in the speech recording 204. The automatic speech recognizer is further configured to provide an acoustic model likelihood score for each word identified in the speech recording 204. In one embodiment, the automatic speech recognizer identifies multiple metrics for each word in the recording. In such an example, the automatic speech recognizer provides an acoustic score for each phone in the word that indicates a quality of pronunciation of that phone (e.g., for the word "bowl," an acoustic score is provided for the "b," the "ow," and the "l" sounds). The automatic speech recognizer 206 further provides a confidence score for the word (e.g., a score indicating how confident the recognizer 206 is that "bowl" is the word spoken in the recording 204). In one example, the automatic speech recognizer or other entities provide other metrics, such as a speech rate metric indicating a speed at which the speaker in the recording 204 is speaking or a predictability of a word in a sentence based on other words in the sentence.

The speech intelligibility determination engine 202 further includes a word context analyzer 212 configured to provide metrics, such as for storage in the intelligibility score data structure 208, that indicate context of phones and/or words detected in the speech 204 by the automatic speech recognizer 206. In one embodiment, the word context analyzer 212 identifies phone-level factors for phones in a word, such as position of the phone in the word and whether the phone is stressed in the word. The word context analyzer 212 is further configured to provide word-level factors such as part of speech and lexical frequency. The phone and/or word context metrics are utilized by downstream entities, such as to provide weights to detected pronunciation errors to measure an effect of those pronunciation errors on the intelligibility of the speech. For example, pronunciation errors at the end of a word or in a non-accented syllable may be weighted less than pronunciation errors at the beginning of a word or in an accented syllable. Further, pronunciation errors of uncommon words in a sentence may be weighted more heavily than pronunciation of common words or words that are likely to occur in a sentence based on other words in the sentence (e.g., mispronunciation of the word "chicken" is weighted more heavily in the phrase "The dean handed him a chicken at graduation;" compared to weighting for the phrase "We ate fried chicken for dinner.").

The speech intelligibility determination engine 202 further includes components (e.g., software modules) for scoring the speech recording 204. In one embodiment, an acoustic scoring model 214 is configured to analyze the pronunciation of phones within words along with the context of those phones to determine word acoustic scores for those words. Further, a word intelligibility determination engine 216 is configured to analyze word-level pronunciation and word context to score intelligibility at the word level. Phone-level scores from the acoustic scoring model 214 and word-level scores from the word intelligibility determination engine 216 are utilized for some or all of the words in the recording to generate a speech intelligibility score 218, such as at the word intelligibility determination engine 216.

Figure 3:
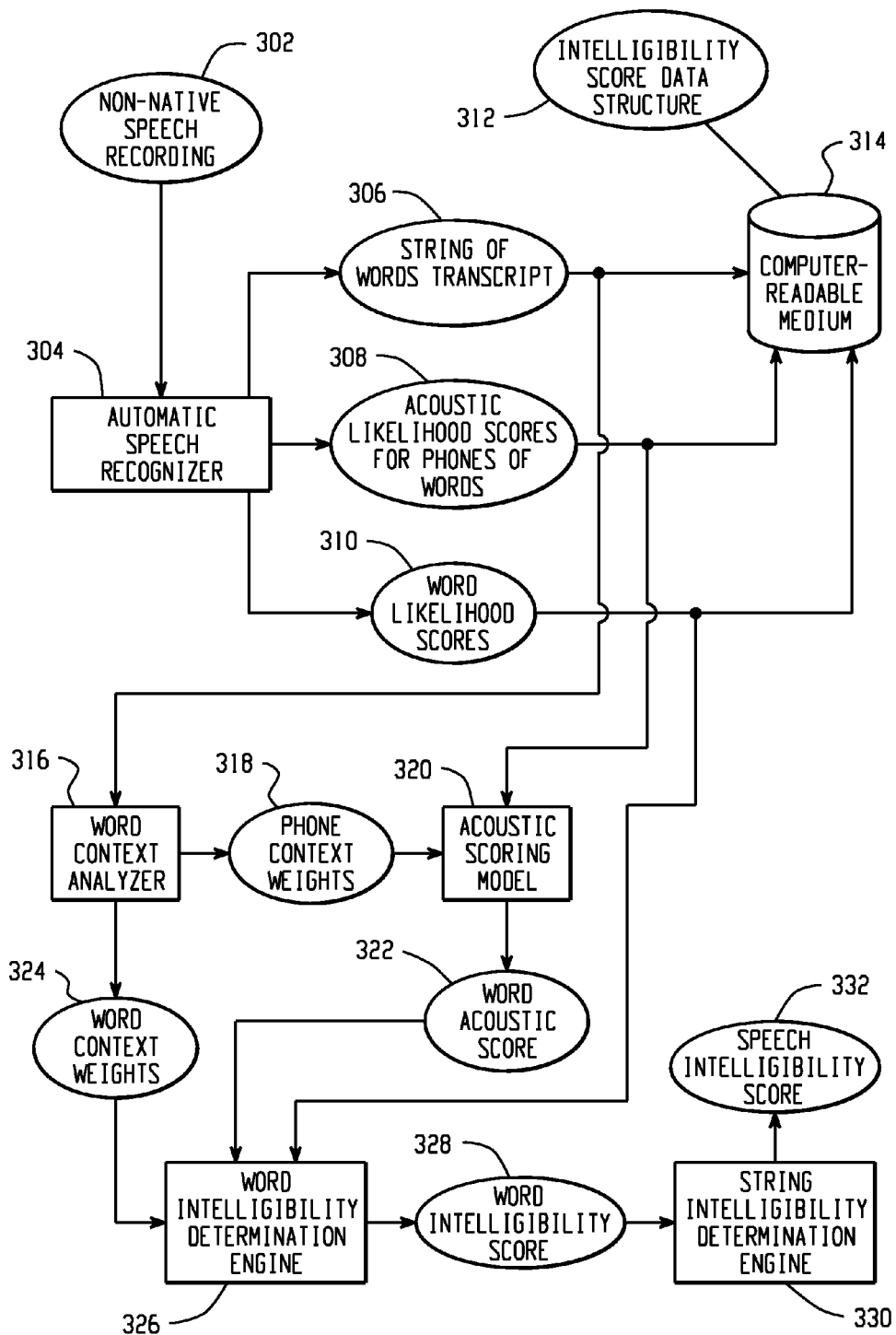
FIG. 3 is a data flow diagram depicting example operations of a speech intelligibility determination engine.

FIG. 3 is a data flow diagram depicting example operations of a speech intelligibility determination engine. A non-native speech recording 302 is received by an automatic speech recognizer 304. In one example, the automatic speech recognizer 304 is trained using samples of native and non-native speech using acoustic model training procedures. In other examples, the recognizer 304 is trained using native-only or non-native-only speakers. The automatic speech recognizer provides a transcript 306 of a string of words recognized in the recording, acoustic likelihood scores 308 indicating confidence or quality of pronunciation of individual phones or words in the recording 302, and word likelihood scores indicating a confidence of the automatic speech recognizer 304 that it has correctly recognized those words in the recording 302. The transcript 306 and the metrics 308, 310 are stored in an intelligibility score data structure 312 in a computer readable medium 314. In an example, the acoustic likelihood scores 308 are computed as average raw values of acoustic model likelihood scores for each phone or more complex measures such as goodness of pronunciation scores based on acoustic model likelihood scores and prior probabilities for each phone. Word likelihood scores 310 are provided based on a confidence of the automatic speech recognizer 304 that it has identified the correct word in the transcript 306.

A word context analyzer 316 receives the transcript 306 and utilizes that transcript to determine one or more context metrics for words within the transcript 306. In one embodiment, the word context analyzer 316 determines phone-level context metrics for phones in words of the transcript 306, where in the example of FIG. 3, those phone-level context metrics (e.g., metrics based on the context of a particular phone within a particular word) are utilized to generate phone context weights 318 that are transmitted to an acoustic scoring model 320. Phone context weights 318 can be based on a variety of phone-level context metrics including lexical stress, type of phone (e.g., vowel or consonant), position in word, position in syllable, and syllable weight. In one example, the phone context weights can be calculated by a computer processing system by referencing a computer-readable storage medium that includes a table of weights based on phone-level context metric values (e.g., increase context weight 0.1 for vowels, increase context weight 0.2 for phones at the start of a word).

The acoustic scoring model 320 receives acoustic likelihood scores 308 for each phone in the transcript 306 as well as the phone context weights 318 for those phones from the word context analyzer 316. The acoustic scoring model 320 transforms those values 308, 318 into a word acoustic score 322 for each word in the transcript 306. In one example, the acoustic scoring model is a computerized model that is configured to generate a word acoustic score 322 for a particular word based on a per-phone average of the product of a phone context weight 318 and acoustic likelihood score 308 for each phone of the particular word.

The word context analyzer 316 is further tasked with determining word-level context metrics for words in the transcript 306. For example, a word-level context metric may identify a likelihood of a particular word in the transcript 306 appearing at its position in the transcript 306 based on other words in the transcript 306 as analyzed with reference to a corpus of training documents. As another example, a word-level context metric may identify how commonly the particular word is used in a corpus of documents. Other word-level context metrics can be based on part of speech, position in sentence, grammar errors, and position in phrase. The word-level context metrics are utilized to determine word context weights 324 that are provided to a word intelligibility determination engine 326.

The word intelligibility determination engine 326 receives word likelihood scores 310 for each word in the transcript 306 from the automatic speech recognizer 304 as well as the word context weights 324 for those words from the word context analyzer. The word intelligibility determination engine 326 transforms those values 310, 324 into a word level score for each word in the transcript 306. In one example, a word level score for a particular word is based on a product of the word likelihood score 310 and the word context weight 324 the particular word.

In the example of FIG. 3, the word intelligibility determination engine 326 transforms the word acoustic score 322 for the particular word and the word level score for the particular word into a word intelligibility score 328. The word intelligibility score 328 is received by a string intelligibility determination engine 330 that generates a speech intelligibility score 332 for the speech recording. In one embodiment, the speech intelligibility score 332 is based on an average of word intelligibility scores 328 for the recording or other combination of those word intelligibility scores 328.

Following is an example determination of a word intelligibility score determination process. In this example, the automatic speech recognizer 304 recognizes the sentence: "The trees use their bowl-shaped leaves to retain water." This transcript 306 is stored in the intelligibility score data structure 312 along with various metrics and intermediate scores used in determining a speech intelligibility score 322 for the phrase. For the particular word "bowl," the word intelligibility score 328 is calculated according to:

$$IS_{bowl} = f(AM_{bowl}, LM_{bowl}, CS_{bowl}, Lex_{bowl}), \quad \text{(eq. 1)}$$

where $IS_{bowl}$ is the intelligibility score 328 for the word "bowl," $AM_{bowl}$ is a word acoustic score 322 for the word "bowl," $LM_{bowl}$ is the probability of the word "bowl" in a given context using different lengths of left and right context (e.g., the probability of "bowl" in the following phrases: "their bowl," "use their bowl," "bowl-shaped," "bowl-shaped leaves," etc.), $CS_{bowl}$ is the automatic speech recognizer 304 confidence score outputted as a word likelihood score 310, and $Lex_{bowl}$ is a lexical score for the word bowl based on a combination of measurements such as lexical frequency in one or more corpora and point-wise mutual information between "bowl" and other words in the sentence.

In one example, the word acoustic score ($AM_{bowl}$) is calculated according to $$AM_{bowl} = AM_b * w_{initial} * w_{consonant} + AM_{ow} * w_{vowel} * w_{stressed} + AM_l + \text{speech\_rate}_{bowl}, \quad \text{(eq. 2)}$$

where $AM_b$ is an acoustic likelihood score 308 for the "b" phone in "bowl," $w_{initial}$ is a weight associated with "b" being at the beginning of the word, $w_{consonant}$ is a weight associated with the "b" phone being a consonant, $AM_{ow}$ is an acoustic likelihood score 308 for the "ow" phone, $w_{vowel}$ is a weight associated with "ow" being a vowel phone, $w_{stressed}$ is a weight associated with "ow" being an accented phone, AM' is an acoustic likelihood score 308 for the "l" phone, and speech_rate$_{bowl}$ is a metric associated with the rate of speech of the word "bowl."

Having calculated the component terms of eq. 1, the word intelligibility determination engine 326 determines a word intelligibility score 328 for the word "bowl," according to a formula such as:

$$IS_{bowl} = a + b_1 * AM_{bowl} + b_2 * LM_{bowl} + b_3 * CS_{bowl} + b_4 * Lex_{bowl}, \quad \text{(eq. 3)}$$

where a, $b_1$, $b_2$, $b_3$, and $b_4$ are constant weights determined via a model training operation, such as a model training operation that analyzes correlations between metrics of recognized training speech and human-provided intelligibility scores for that training speech.

Figure 4:
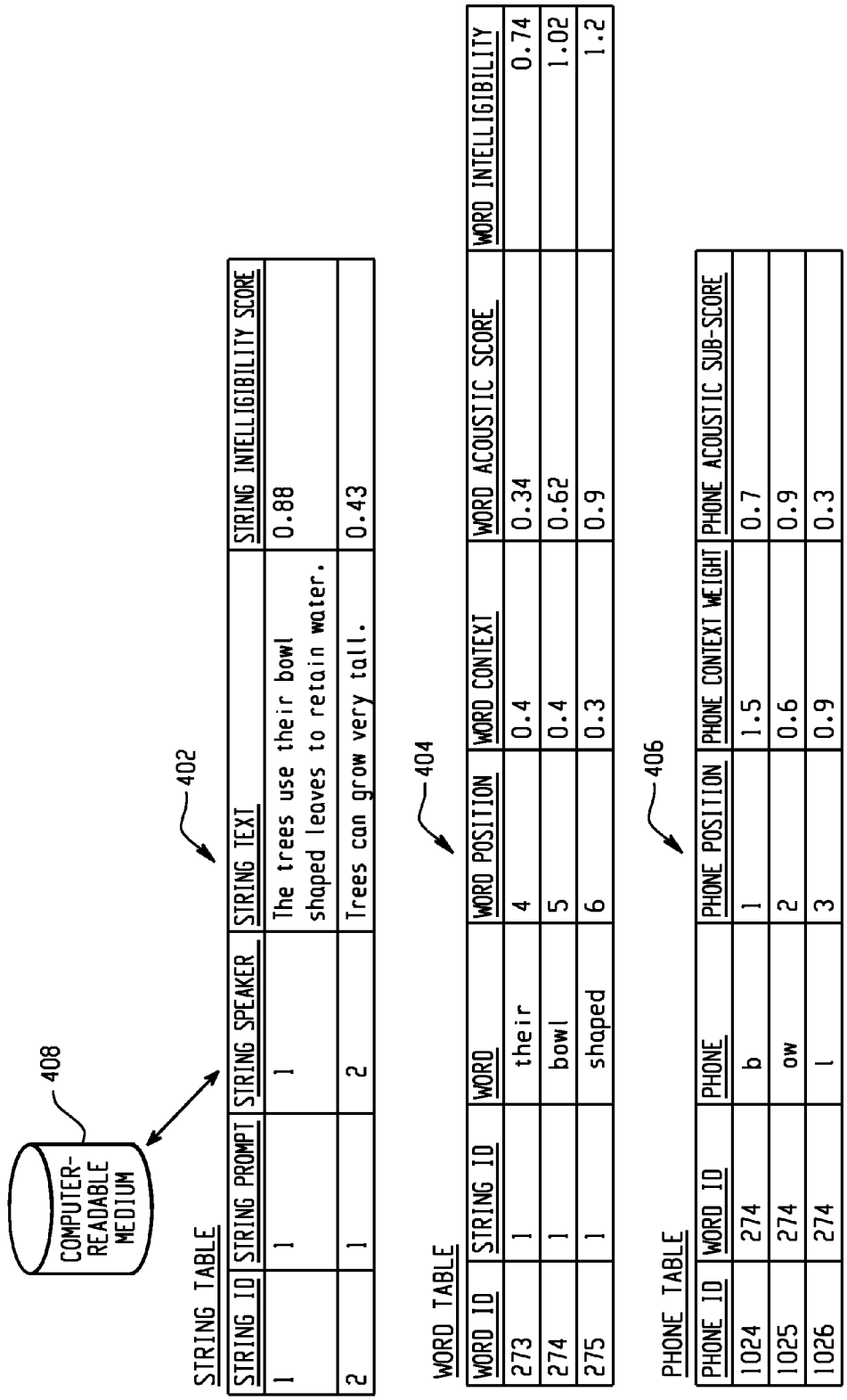
FIG. 4 is a diagram depicting an example intelligibility score data structure stored in a computer-readable storage medium.

FIG. 4 is a diagram depicting an example intelligibility score data structure stored in a computer-readable storage medium. The example data structure of FIG. 4 is stored in three tables 402, 404, 406 of a relational database on the computer-readable medium 408. A string table 402 stores recognized text of strings as well as data indicating a prompt with which the string is associated, a speaker of the string, and a string intelligibility score for the string. A word table 404 is configured to contain data associated with words in a string. In the example of FIG. 4, the word table 404 contains data associated with three words of string ID 1. The word table identifies a position of a word in its string, a word context weight for that word, a word acoustic score for that word, and a word intelligibility score for that word. A phone table 406 includes data associated with phones of individual words. The phone table includes data for phones of the word "bowl" including a position of phones within that word, phone context weights for those phones, and phone associated sub-scores (e.g., a product of a phone context weight and a acoustic likelihood score for that phone).

Figure 5:
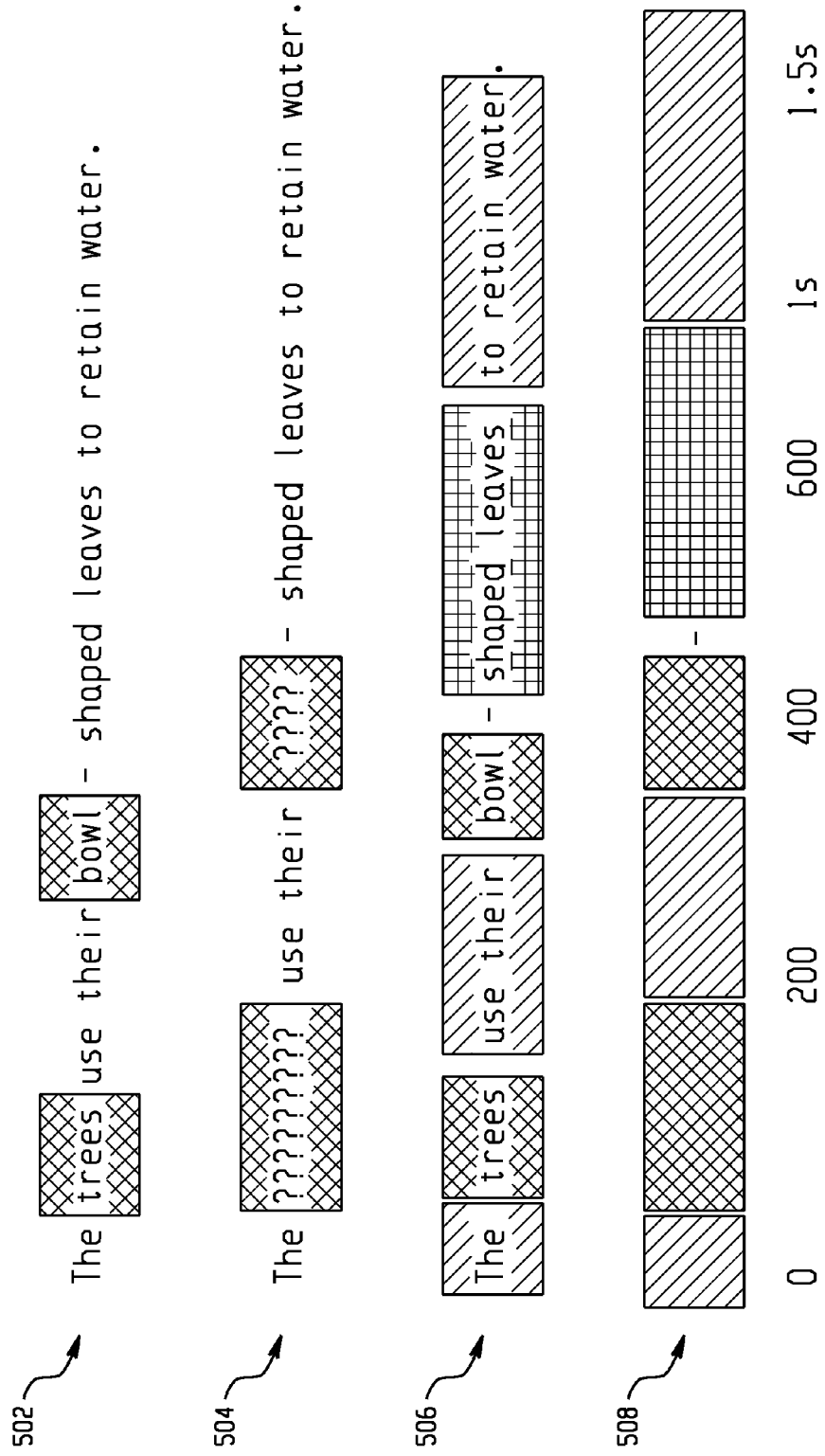
FIG. 5 is a diagram depicting four example intelligibility feedback displays.

In addition to outputting an overall speech intelligibility score 322 for a speech sample, a speech intelligibility determination engine can be configured to provide feedback to a speaker, such as via a graphical user interface. FIG. 5 is a diagram depicting four example intelligibility feedback displays. At 502, a first display is provided that highlights words having word intelligibility scores less than a threshold value. At 504, a second display uses highlighting and question marks to identify words having word intelligibility scores less than a threshold value. In a third example at 506, different color highlights or a gradient of colors are used to indicate word intelligibility scores. In one embodiment, well spoken words having intelligibility scores above a first threshold are highlighted in green, poorly spoken words having intelligibility scores below a second threshold are highlighted in red, and other words having intelligibility scores between the first and second thresholds are highlighted in yellow. At 508, an example is provided that depicts colored highlighting on a timeline, indicating portions of a speech timeline where intelligibility scores fell within different ranges demarcated by the first and second thresholds.

Figure 6:
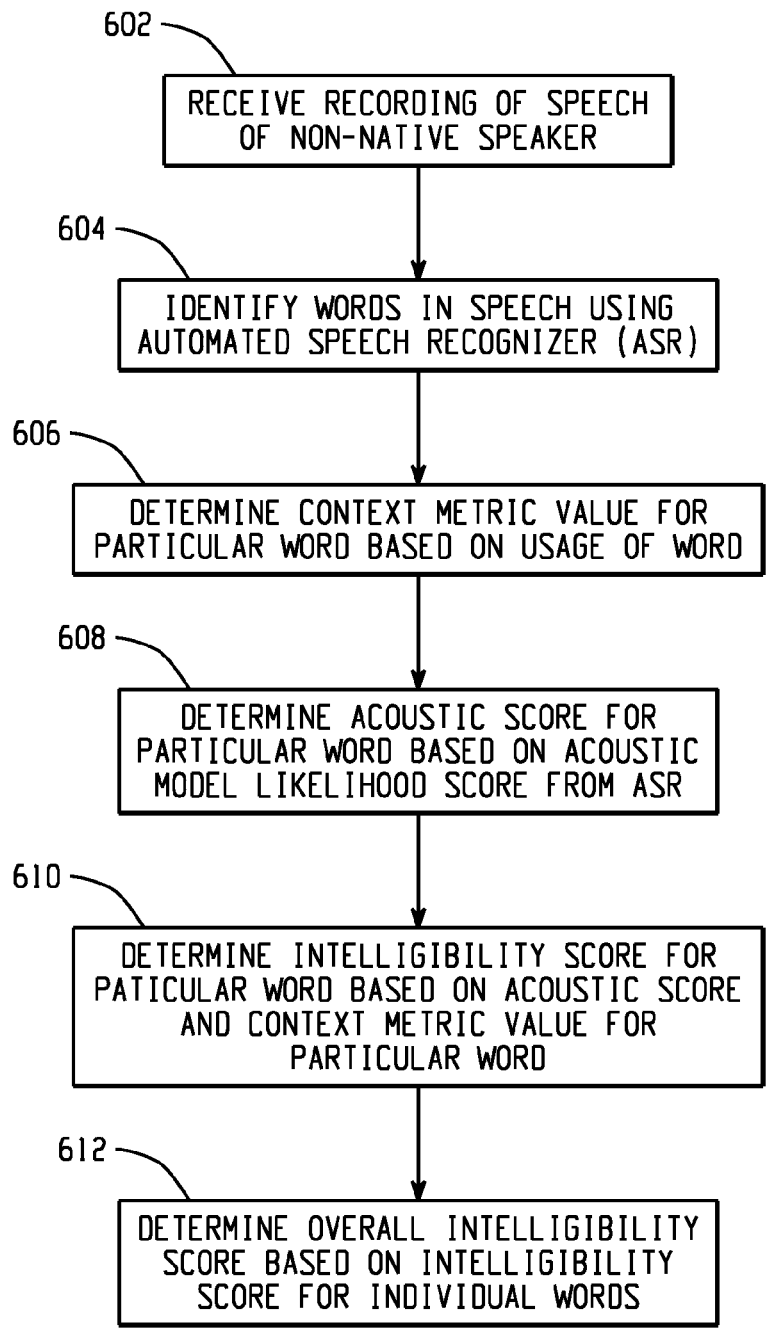
FIG. 6 is a flow diagram depicting a computer-implemented method for generating an intelligibility score for speech of a non-native speaker.

FIG. 6 is a flow diagram depicting a computer-implemented method for generating an intelligibility score for speech of a non-native speaker. A speech recording of a non-native speaker is received at 602. At 604, words in a speech recording are identified using an automated speech recognizer, where the automated speech recognizer provides a string of words identified in the speech recording, and where the automated speech recognizer further provides an acoustic model likelihood score for each word in the string of words. For a particular word in the string of words, at 606, a context metric value is determined based upon a usage of the particular word within the string of words. An acoustic score for the particular word is determined at 608 based on the acoustic model likelihood score for the particular word from the automated speech recognizer. At 610, an intelligibility score is determined for the particular word based on the acoustic score for the particular word and the context metric value for the particular word, and an overall intelligibility score for the string of words is determined at 612 based on the intelligibility score for the particular word and intelligibility scores for other words in the string of words.

Figure 7A:
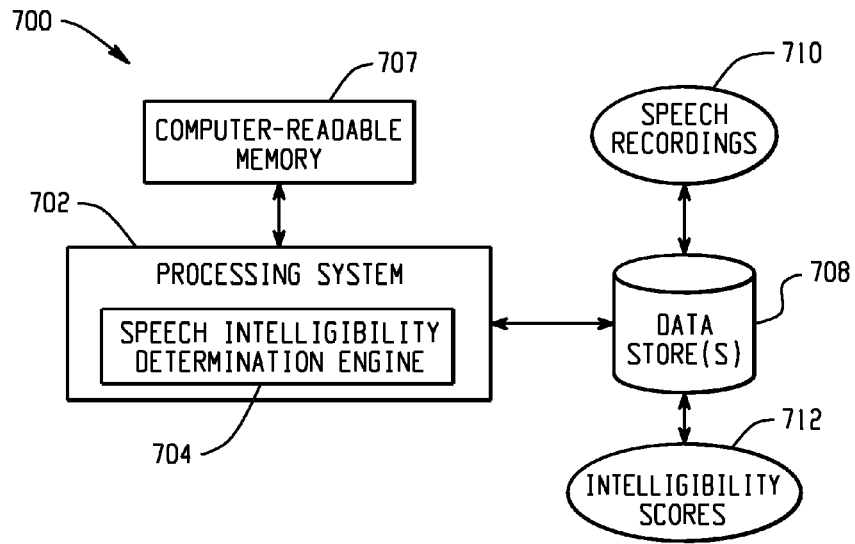
FIGS. 7A, 7B, and 7C depict example systems for implementing the approaches described herein for generating an intelligibility score for speech.
Figure 7B:
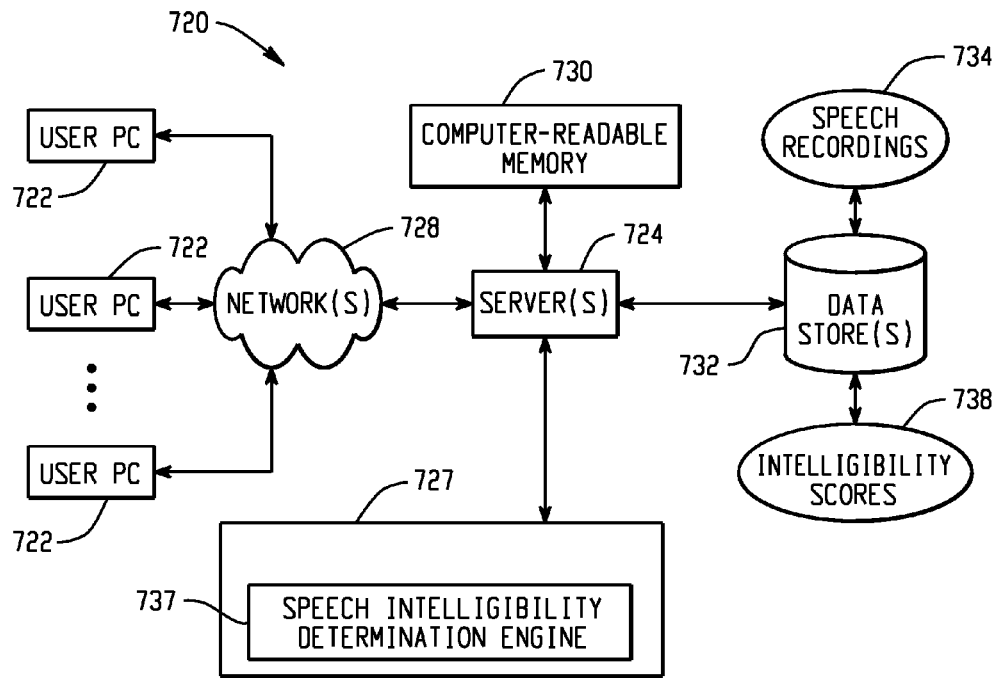
Figure 7C:
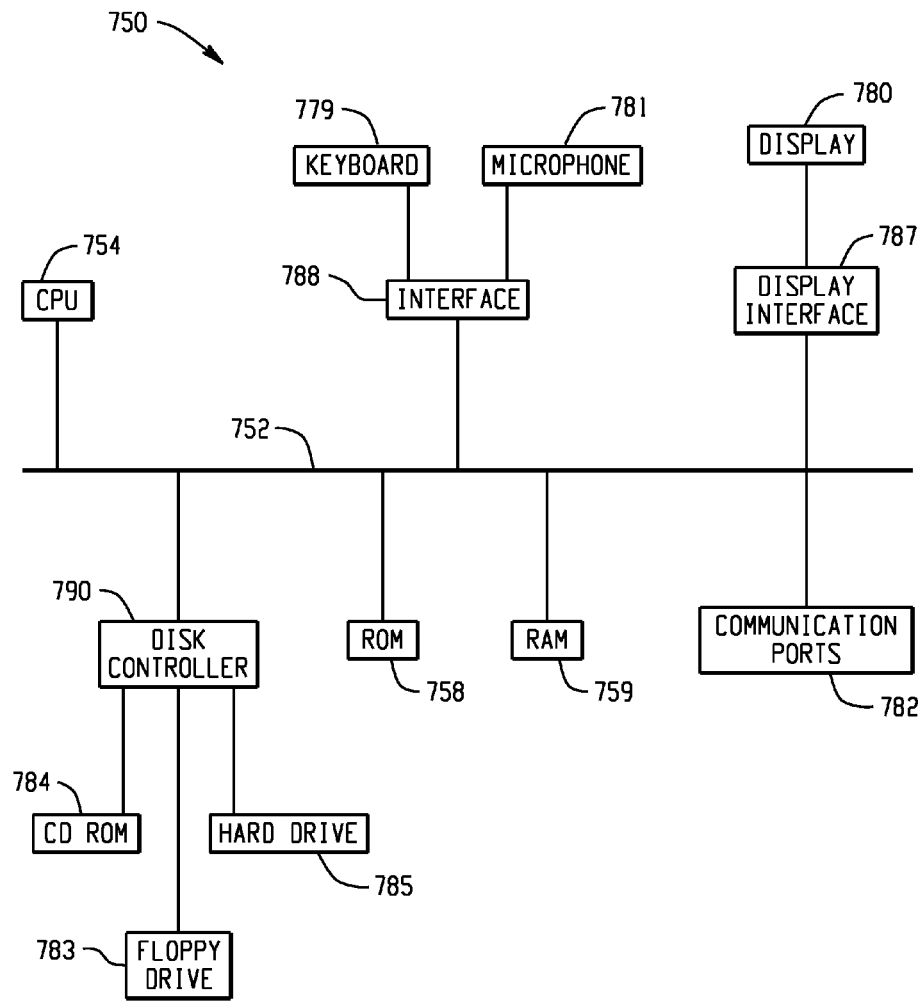

FIGS. 7A, 7B, and 7C depict example systems for implementing the approaches described herein for generating an intelligibility score for speech. For example, FIG. 7A depicts an exemplary system 700 that includes a standalone computer architecture where a processing system 702 (e.g., one or more computer processors located in a given computer or in multiple computers that may be separate and distinct from one another) includes a speech intelligibility determination engine 704 being executed on the processing system 702. The processing system 702 has access to a computer-readable memory 707 in addition to one or more data stores 708. The one or more data stores 708 may include speech recordings 710 as well as intelligibility scores 712. The processing system 702 may be a distributed parallel computing environment, which may be used to handle very large-scale data sets.

FIG. 7B depicts a system 720 that includes a client-server architecture. One or more user PCs 722 access one or more servers 724 running a speech intelligibility determination engine 737 on a processing system 727 via one or more networks 728. The one or more servers 724 may access a computer-readable memory 730 as well as one or more data stores 732. The one or more data stores 732 may include speech recordings 734 as well as intelligibility scores 738.

FIG. 7C shows a block diagram of exemplary hardware for a standalone computer architecture 750, such as the architecture depicted in FIG. 7A that may be used to include and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 758 and random access memory (RAM) 759, may be in communication with the processing system 754 and may include one or more programming instructions for performing the method of generating an intelligibility score for speech. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 707, 730, 758, 759 or data stores 708, 732, 783, 784, 788 may include one or more data structures for storing and associating various data used in the example systems for generating an intelligibility score for speech. For example, a data structure stored in any of the aforementioned locations may be used to store data from XML files, initial parameters, and/or data for other variables described herein. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computerized approaches described herein, which utilize, e.g., various computer models trained according to sample data, are very different from conventional human scoring of the quality of speech of a non-native language speaker. In conventional human scoring of the quality of speech of a non-native language speaker, a human graders listens to the speech of the non-native speaker and makes a holistic judgment about the quality of the speech and assigns a score. Conventional human grading of the quality of speech of a non-native speaker does not involve the use of the computer models, associated variables, training of the models based on sample data to calculate weights of various features or variables, computer processing to parse speech samples to be scored and representing such parsed speech samples with suitable data structures, and applying the computer models to those data structures to score the speech samples, as described herein.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of generating an intelligibility score for speech of a non-native speaker, comprising:
    receiving a recording of speech of a non-native speaker at a processing system;
    identifying words in the speech recording using a computerized automated speech recognizer, wherein the automated speech recognizer provides a string of words identified in the speech recording based on a computerized acoustic model, and wherein the automated speech recognizer further provides an acoustic model likelihood score for each word in the string of words;
    determining a context metric value for each word in the string of words, wherein determining a context metric value includes, for a particular word in the string of words, determining a context metric value with the processing system based upon a usage of the particular word within the string of words;
    determining an acoustic score with the processing system for the particular word based on the acoustic model likelihood score for the particular word from the automated speech recognizer, wherein determining the acoustic score for the particular word comprises:
        determining a phone context for a phone of the particular word;
        determining a phone context weight for the phone based on the phone context, each phone of the particular word being assigned a single phone context weight;
        determining a phone acoustic score for the phone that identifies a likelihood that the non-native speaker was actually pronouncing the phone based on the phone context weight and an acoustic model likelihood score for the phone, wherein the acoustic score for the particular word is based on phone acoustic scores for multiple phones of the particular word;
    determining an intelligibility score with the processing system for the particular word based on the acoustic score for the particular word and the context metric value for the particular word; and
    determining an overall intelligibility score with the processing system for the string of words based on the intelligibility score for the particular word and intelligibility scores for other words in the string of words.

2. The method of claim 1, wherein the context weight for a particular phone is based on one or more of a position of the particular phone in the word, whether the particular phone is a vowel phone, and whether the particular phone is stressed.

3. The method of claim 1, wherein the acoustic score for the particular word is based on a sum of the acoustic model likelihood score multiplied by the adjusted context weight for each phone of the particular word.

4. The method of claim 1, wherein the acoustic score for the particular word is calculated using a formula consisting of:

$$AM_{word} = \sum_{i=1}^{N} AM_i * w_i,$$

where $AM_{word}$ is the acoustic score for the particular word, N is the number of phones in the particular word, $AM_i$ is the acoustic model likelihood score for the ith phone of the particular word, and $w_i$ is the adjusted context weight for the ith phone of the particular word.

5. The method of claim 1, wherein the context metric value is based on a probability of the particular word being used with the other words in the string of words, a part of speech of the particular word, and a frequency of occurrence of the particular word in a corpus of documents.

6. The method of claim 1, further comprising:
    comparing the intelligibility score for the particular word to an intelligibility threshold to determine whether the particular word meets an intelligibility criterion;
    wherein the overall intelligibility score for the string of words is based on a proportion of words in the string of words that meet the intelligibility criterion.

7. The method of claim 6, wherein the intelligibility threshold is set based on a model training operation that utilizes training recordings of speech manually scored for intelligibility by one or more human scorers.

8. The method of claim 7, wherein the model training operation comprises determining training intelligibility scores for words within the training recordings of speech and correlating the training intelligibility scores with the manual scores assigned by the one or more human scorers.

9. The method of claim 8, wherein correlating comprises establishing a function which maps intelligibility scores to manual scores.

10. The method of claim 1, wherein the overall intelligibility score is based on an average intelligibility score of all words in the string of words or a subset of words considered eligible for computing the intelligibility score.

11. The method of claim 1, wherein the words in the speech recording are identified by the automated speech recognizer.

12. The method of claim 1, wherein a second word having a same acoustic score as the acoustic score for the particular word is determined to have a different intelligibility score based on differing context metric values between the particular word and the second word.

13. The method of claim 1, wherein the automated speech recognizer further provides an acoustic model likelihood score for each phone within each word, a language model likelihood score for each word, and a confidence score for each word.

14. The method of claim 1, wherein the context metric value is further based upon a part of speech of the particular word or a lexical frequency of the particular word.

15. The method of claim 1, further comprising providing a display that includes the identified words and the overall intelligibility score.

16. A computer-implemented system for generating an intelligibility score for speech of a non-native speaker, comprising:
   a processing system comprising one or more data processors;
   a non-transitory computer-readable medium encoded to contain:
      a recording of speech of a non-native speaker;
      an intelligibility score data structure comprising records associated with each word of a string of words, wherein a record for a particular word in the string of words includes fields for storing an acoustic score for the particular word, a context metric value for the particular word, and an intelligibility score for the particular word;
      instructions for commanding the processing system to execute steps comprising:
         identifying words in the speech recording using an automated speech recognizer, wherein the automated speech recognizer provides a string of words identified in the speech recording, and wherein the automated speech recognizer further provides an acoustic model likelihood score for each word in the string of words;
         determining a context metric value for each word in the string of words, wherein determining a context metric value includes, for the particular word, determining a context metric value based upon a usage of the particular word within the string of words and storing the context metric value in the intelligibility score data structure record for the particular word;
         determining an acoustic score for the particular word based on the acoustic model likelihood score for the particular word from the automated speech recognizer and storing the acoustic score in the intelligibility score data structure record for the particular word, wherein determining the acoustic score for the particular word comprises:
            determining a phone context for a phone of the particular word;
            determining a phone context weight for the phone based on the phone context, each phone of the particular word being assigned a single phone context weight;
            determining a phone acoustic score for the phone that identifies a likelihood that the non-native speaker was actually pronouncing the phone based on the phone context weight and an acoustic model likelihood score for the phone, wherein the acoustic score for the particular word is based on phone acoustic scores for multiple phones of the particular word;
         determining an intelligibility score for the particular word based on the acoustic score for the particular word and the context metric value for the particular word and storing the intelligibility score in the intelligibility score data structure record for the particular word; and
         determining an overall intelligibility score for the string of words based on the intelligibility score for the particular word and intelligibility scores for other words in the string of words.

17. The system of claim 16, wherein the context weight for a particular phone is based on one or more of a position of the particular phone in the word, whether the particular phone is a vowel phone, and whether the particular phone is stressed.

18. The system of claim 16, wherein the acoustic score for the particular word is based on a sum of the acoustic model likelihood score multiplied by the adjusted context weight for each phone of the particular word.

19. A non-transitory computer-readable medium encoded with instructions for commanding a processing system to execute a method of generating an intelligibility score for speech of a non-native speaker, comprising:
   receiving a recording of speech of a non-native speaker;
   identifying words in the speech recording using an automated speech recognizer, wherein the automated speech recognizer provides a string of words identified in the speech recording, and wherein the automated speech recognizer further provides an acoustic model likelihood score for each word in the string of words;
   determining a context metric value for each word in the string of words, wherein determining a context metric value includes, for a particular word in the string of words, determining a context metric value with the processing system based upon a usage of the particular word within the string of words;
   determining an acoustic score for the particular word based on the acoustic model likelihood score for the particular word from the automated speech recognizer, wherein determining the acoustic score for the particular word comprises:
      determining a phone context for a phone of the particular word;
      determining a phone context weight for the phone based on the phone context, each phone of the particular word being assigned a single phone context weight;

determining a phone acoustic score for the phone that identifies a likelihood that the non-native speaker was actually pronouncing the phone based on the phone context weight and an acoustic model likelihood score for the phone, wherein the acoustic score for the particular word is based on phone acoustic scores for multiple phones of the particular word;

determining an intelligibility score for the particular word based on the acoustic score for the particular word and the context metric value for the particular word; and determining an overall intelligibility score for the string of words based on the intelligibility score for the particular word and intelligibility scores for other words in the string of words.

20. A computer-implemented system for generating an intelligibility score for speech of a non-native speaker, comprising:

means for receiving a recording of speech of a non-native speaker;

means for identifying words in the speech recording using a computerized automated speech recognizer, wherein the automated speech recognizer provides a string of words identified in the speech recording based on a computerized acoustic model, and wherein the automated speech recognizer further provides an acoustic model likelihood score for each word in the string of words;

means for determining a context metric value for each word in the string of words, wherein determining a context metric value includes, for a particular word in the string of words, determining a context metric value with the processing system based upon a usage of the particular word within the string of words;

means for determining an acoustic score with the processing system for the particular word based on the acoustic model likelihood score for the particular word from the automated speech recognizer, wherein determining the acoustic score for the particular word comprises:

determining a phone context for a phone of the particular word;

determining a phone context weight for the phone based on the phone context, each phone of the particular word being assigned a single phone context weight;

determining a phone acoustic score for the phone that identifies a likelihood that the non-native speaker was actually pronouncing the phone based on the phone context weight and an acoustic model likelihood score for the phone, wherein the acoustic score for the particular word is based on phone acoustic scores for multiple phones of the particular word;

means for determining an intelligibility score with the processing system for the particular word based on the acoustic score for the particular word and the context metric value for the particular word; and means for determining an overall intelligibility score with the processing system for the string of words based on the intelligibility score for the particular word and intelligibility scores for other words in the string of words.

* * * * *